United States Patent [19]

Kimble et al.

[11] Patent Number: 5,339,182

[45] Date of Patent: Aug. 16, 1994

[54] METHOD AND APPARATUS FOR QUANTUM COMMUNICATION EMPLOYING NONCLASSICAL CORRELATIONS OF QUADRATURE-PHASE AMPLITUDES

[75] Inventors: Harry J. Kimble, LaCanada, Calif.; Zhe-Yu Ou, Indianapolis, Ind.; Silvania E. Pereira, Pasadena, Calif.

[73] Assignee: California Institute of Technology, Pasadena, Calif.

[21] Appl. No.: 19,594

[22] Filed: Feb. 19, 1993

[51] Int. Cl.$^5$ ............................................. H04B 10/00
[52] U.S. Cl. ................................. 359/112; 359/134; 359/160
[58] Field of Search ............... 359/112, 134, 156, 160, 359/173, 192, 195, 188

[56] References Cited

U.S. PATENT DOCUMENTS 5,113,524 5/1992 Hirota et al. ..................... 359/173

OTHER PUBLICATIONS

Bennett et al. "Eavesdrop-Detecting Quantum Communications Channel", IBM Technical Disclosure Bulletin, vol. 26, No. 8, Jan. 1984, pp. 4363-4366.
"Proposal for almost noise-free optical communication under conditions of high background".
Optical Society of America, vol. 1, pp. 108-110 by L. Mandel, Mar. 1984.
"Optical communication channel based on coincident photon pairs" Applied Optics, vol. 24, pp. 3877-3882 by Chung K. Hong et al., Nov. 15, 1985.
"Quantum Cryptography" Scientific American, Oct. 1992, pp. 50-57 by Charles H. Bennette, Gilles Brassard and Artur K. Ekert.

"Realization of the Einstein-Podolsky-Rosen Paradox for Continuous Variables".
Physical Review Letters, vol. 68, No. 25, pp. 3663-3666 by Z. Y. Ou, S. F. Pereria, H. J. Kimble, and K. C. Peng, Jun. 22, 1992.
"Realization of the Einstein-Podolsky-Rosen Paradox for Continuous Variables in Nondegenerate Parametric Amplification" Applied Physics B, B 55, pp. 265-278 by Z. Y. Ou et al., 1992.

*Primary Examiner*—Richard E. Chilcot, Jr.
*Assistant Examiner*—Kinfe-Michael NeGash
*Attorney, Agent, or Firm*—Blakely, Sokoloff, Taylor & Zafman

[57] ABSTRACT

An optical information transmission system capable of achieving an information transmission at a signal to noise ratio greater than that which is achievable using classical optical transmission techniques if disclosed. The higher signal to noise ratio is achieved by employing a non-classical, i.e. quantum mechanical, optical transmission technique. To achieve non-classical transmission effects, a non-degenerate optical parametric amplifier is employed to generate a pair of signal beams having highly correlated quantum noise. Information is then encoded within each of the signal beams at a signal level far below the level of the quantum noise. Accordingly, information encoded on the beams is substantially obscured by the quantum noise, thereby effectively preventing unwanted eavesdropping of the transmitted information. After transmission, the pair of separate signal beams are detected and combined by a receiver. The highly correlated quantum noise is eliminated from the signals, leaving substantially only the encoded information. A resulting information signal has a minimum noise level below that which can be achieved using non-classical techniques.

22 Claims, 8 Drawing Sheets

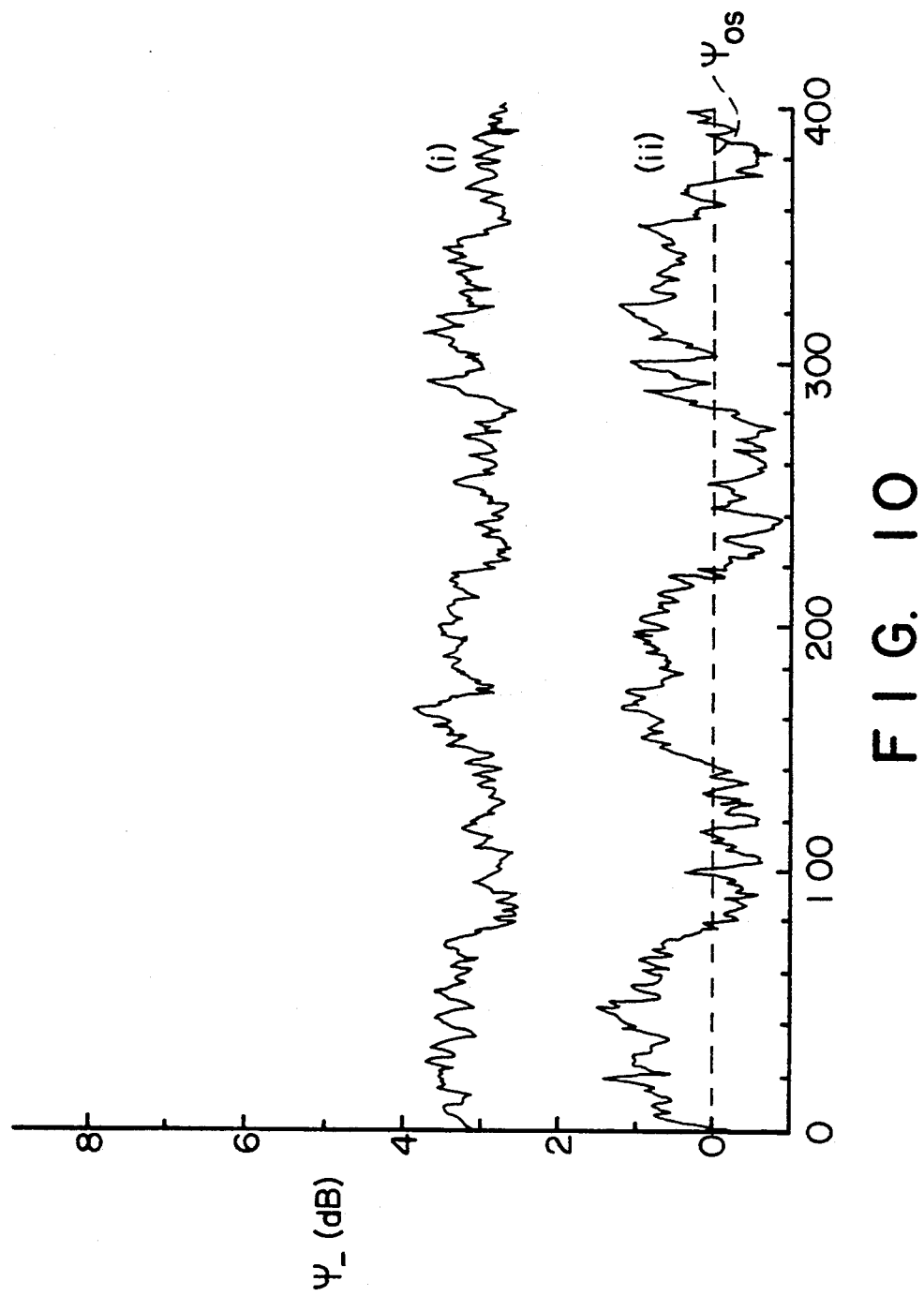

METHOD AND APPARATUS FOR QUANTUM COMMUNICATION EMPLOYING NONCLASSICAL CORRELATIONS OF QUADRATURE-PHASE AMPLITUDES

ORIGIN OF THE INVENTION

The U.S. Government has certain rights in this invention pursuant to Grant No. PHY-9014547 awarded by the National Science Foundation and Grant No. N00014-90-J-1058 awarded by the Office of Naval Research.

BACKGROUND OF THE INVENTION

1. Field of the Invention

The invention generally relates to optical communication systems and in particular to an optical communication system capable of encoding information for transmission in a manner immune from eavesdropping.

2. Description of Related Art

A wide variety of optical transmission system and techniques have been employed to transmit information from one point to another. Often it is desirable to transmit the information in a manner which is immune from eavesdropping. Conventional cryptographic techniques have been employed to encrypt the transmitted information such that, if the optical transmission is intercepted, the information content of the message is difficult or impossible to decode.

A wide range of techniques and algorithms have been developed over the centuries for encoding data. However, it has been long been a goal of cryptography to transmit information which is substantially immune from eavesdropping yet does not require elaborate encryption techniques or algorithms. To this end, it has been proposed to transmit data within a noisy signal, wherein the noise obscures the encoded information to the extent that the information can not be extracted from the noise. By obscuring information within a noisy signal, the information is substantially immune from eavesdropping, even though the information may not be encoded subject to an encryption algorithm. Thus, the intended receiver of the information need only be capable of subtracting the noise from the signal to recover the information content. The receiver need not decode the message.

An exemplary optical transmission system employing such a technique modulates information onto an optical beam, then adds correlated noise to the beam. The beam is split into a pair of beams, by a conventional means such as a beam splitter. The correlated noise is sufficient to obscure the modulated information of the signal by producing a signal to noise ratio (SNR) of substantially less than one for either beam alone. The pair of beams are then transmitted independently to an intended receiver. The intended receiver combines the pair of signals to eliminate the correlated noise, thereby leaving only the correlated information content. To prevent the information content from also being eliminated, the information is preferably modulated onto the optical beams in complementary modes such that, when one optical beam is subtracted from the other, the information is not eliminated. To this end one of the optical beams may be "inverted" prior to transmission. Once the correlated noise is subtracted from the signals, the information signal remaining on the beams has a signal to noise ratio greater than 1, such that it can be demodulated from the beam. With this technique data is transmitted in a manner relatively immune of eavesdropping without requiring the use of an encryption algorithm. Hence, the intended receiver of the information need not employ any decoding technique to decipher the information, other than to subtract the correlated noise content from the pair of signals.

However, as a result of vacuum noise inherent in any optical transmission system, a fundamental minimum noise limit affects the resulting signal to noise ratio of the information signal. The vacuum noise limits the usefulness of the technique.

SUMMARY OF THE INVENTION

From the foregoing, it can be appreciated that there is a need to provide an improved optical transmission system wherein data is obscured within a signal having a low signal to noise ratio, which is not subject to the inherent vacuum noise limitations of classical optical transmission techniques. Accordingly, it is an object of the invention to provide such an improved optical information transmission system. It is a further object of the invention to provide such a system in which high correlations between the information contents of the pair of signals and the noise contents of the pair of signals are readily achieved.

These and other objects of the invention are achieved by a method of transmitting information which employs non-classical optical correlations between a pair of transmission beams. The method exploits a quantum mechanical phenomena wherein a pair of optical beams are generated having highly correlated quantum noise. A message is added to the beams with a signal level substantially below the level of the correlated noise. By employing a non-classical, i.e. quantum mechanical, signal transmission technique, a final signal to noise ratio is achieved which is above that possible using classical optical signal transmission techniques. In particular, vacuum noise limitations, which are inherent in any classical optical transmission technique, are substantially overcome using the quantum mechanical-based transmission technique.

In accordance with the invention, the method of transmitting information comprises the steps of:

a) generating correlated quantum noise on a pair of beams;

b) modulating the first and second correlated optical beams to encode information onto said beams, with the beams individually an arbitrarily small signal to noise ratio;

c) transmitting the first and second correlated optical beams;

d) detecting the first and second correlated optical beams; and e) subtracting a signal representative of the second beam from a signal representative of the first beam to produce a combined signal having a signal to noise ratio greater than one, and indeed, equal to the signal to noise ratio encoded at transmission.

In accordance with a preferred embodiment of the invention, a non-degenerate optical parametric amplifier (NOPA) is employed to generate the pair of beams having highly correlated quantum noise. The NOPA inherently operates to amplify vacuum noise to an arbitrarily high level which is sufficient to obscure a message within the signals. Moreover, the NOPA inherently operates to a pair of correlated orthogonal beams, such that the amplified quantum noise is highly correlated. Accordingly, the NOPA provides an ideal apparatus for generating a pair of optical beams having correlated quantum noise. With this technique, a variety of modulation techniques may be employed to encode information onto the pair of beams, after the beams are generated using the NOPA.

Also in accordance with the invention, an apparatus for transmitting information is provided which includes:

a) a non-generate optical parametric amplification means for generating first and second correlated optical beams, with the first and second correlated beams having correlated quantum noise;

b) a means for encoding information onto the beams with a signal to noise ratio less than 1 for each individual beam;

c) means for transmitting the beams;

d) a means for detecting the first and second beams; and e) a means for combining signals representative of the first and second beams to subtract eliminate the correlated quantum noise, yet retain the information content, whereby the information content of the combined signal has a signal to noise ratio greater than 1.

In any of its various embodiments, the invention provides an optical information transmission technique which allows information to be obscured within a noisy signal to discourage or prevent eavesdropping, yet which does not require data encryption algorithms for coding and decoding the information content of the message. By employing a non-classical technique for generating a pair of signals having correlated noise, a minimum noise level of the combined signal extracted from the pair of beams is less than a minimum amount achievable using classical techniques. Furthermore, by employing an NOPA for generating the pair of optical beams, highly correlated quantum noise is inherently produced without requiring additional devices or method steps. Moreover, with the transmission system of the invention, an attempt at eavesdropping is easily detected by a change in the signal to noise ratio of the signal. Indeed, a message may be obscured within the individual beams at a sufficiently low signal to noise ratio such that an eavesdropper must intercept and withdraw substantially all of both of the beams to extract the message, thereby having a great and easily detectable effect on the beams.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 10 illustrates spectral density photocurrent fluctuation for low amplitude encoded information.

DETAILED DESCRIPTION OF THE INVENTION

An optical transmission system employing non-classical quadrature phase amplitude transmission techniques is a disclosed. In the following description for the purpose of explanation, numerous details are set forth to provide a thorough understanding of the present invention, however, it will be apparent to one skilled in the art these details are not required in order to practice the present invention. In other instances, well known structures and circuits are shown in block diagram form in order not to obscure fundamental aspects of the invention.

Figure 1:
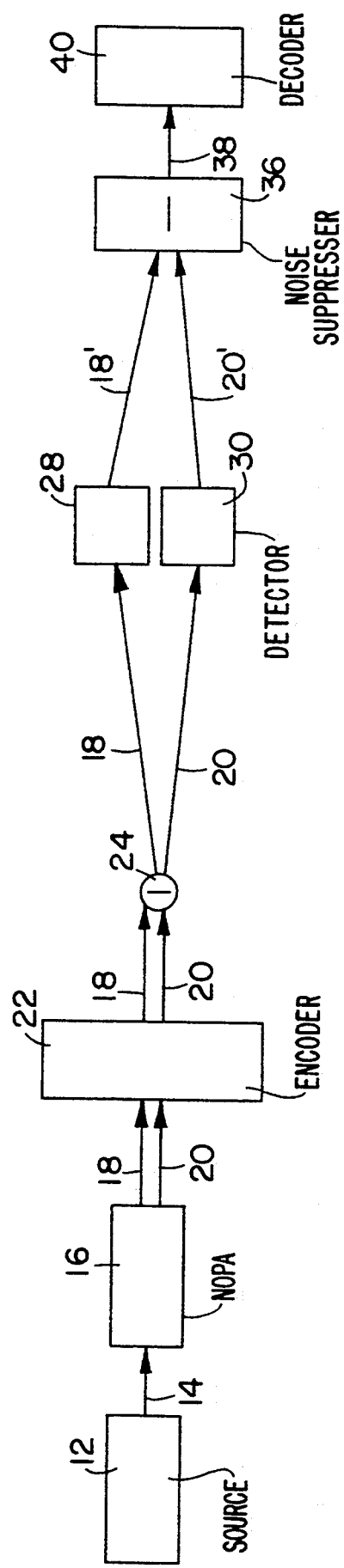
FIG. 1 is a block diagram representing an optical transmission system employing a non-degenerate optical parametric amplifier (NOPA) constructed in accordance with a preferred embodiment of the invention.
Figure 2:
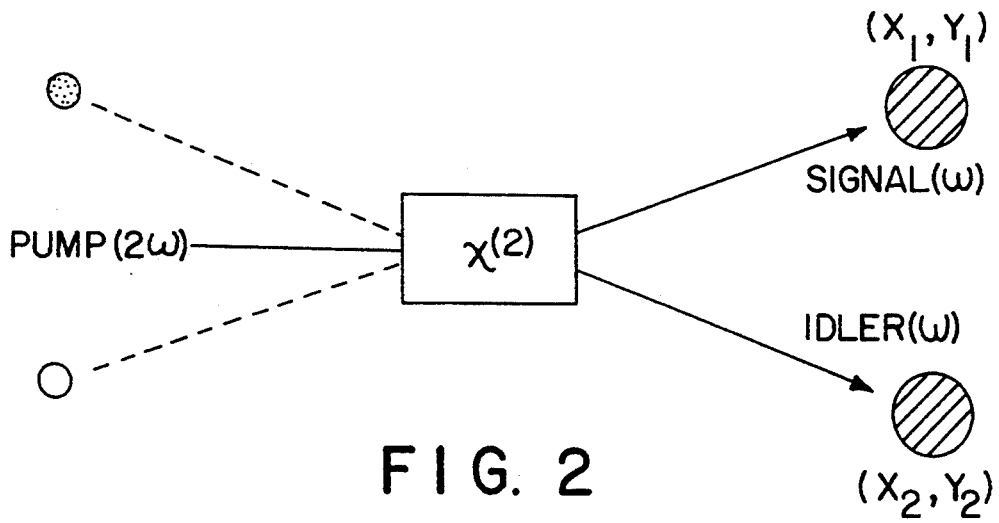
FIG. 2 is a block diagram illustrating non-degenerate parametric down conversion via a second order susceptibility factor.
Figure 3A:
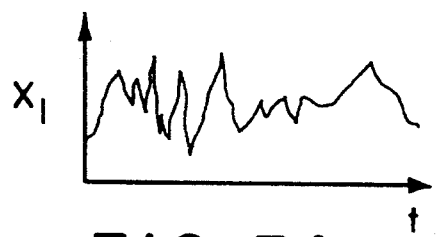
FIGS. 3A-3D are graphical representation of fluctuating field amplitudes in the output signals from the NOPA of FIG. 2 illustrating correlations between quadrature phase amplitudes between the signal beam and the idler beam produced by the NOPA.
Figure 3B:
Figure 3C:
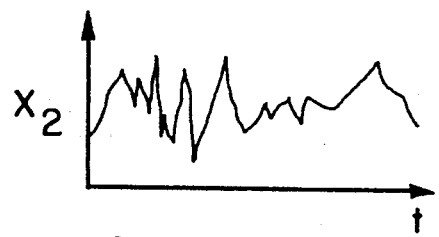
Figure 3D:

Referring to FIGS. 1 and 2, a preferred embodiment of the invention will now be described. FIG. 1 provides a block diagram illustrating an optical transmission system 10 for use in transmitting information within a pair of noisy signal beams such that the information content is obscured within the beams. The optical transmission system includes an optical source 12 for generating a pump optical beam 14. Source 12 may be a laser or similar optical beam generating device. Pump beam 14, generated by source 12, is transmitted into a non-degenerate optical parametric amplifier (NOPA) 16 which uses energy within pump beam 12 to generate a pair of optical beams, namely, a signal beam 18 and an idler beam 20 which, as will be described below, are optically correlated beams having highly correlated noise components. The description and operation of NOPA is described in detail below with reference to FIG. 4.

Signal beam 18 and idler beam 20 are output from NOPA 16 along a single path. Although the beams initially share a common path, the beams differ in optical mode, one being orthogonal to the other. Signal beam 18 and idler beam 20 are transmitted through an information encoder 22 which encodes an information signal onto both of the beams with a signal to noise ratio substantially less than 1. The information encoded, via encoder 22, is below a level at which it can be reliably extracted from only one of the pair of signal beams. Encoder 22 may be any of a number of devices capable of modulating an optical beam. As will be described in more detail below, rather than directly modulating the signal and idler beams, a previously modulated information beam may be added to the signal and idler beams, with the amplitude of the information beam well below the noise level of the signal and idler beams.

Beams 18 and 20 are subsequently transmitted through a polarizer 24, or similar suitable device, which spatially separates the signal and idler beams onto separate paths. The orthogonality of the signal and idler beams is exploited to allow easy separation. Once separated, the beams are transmitted over a desired distance to an intended receiver. Any of a variety of conventional low-loss transmission conduits may be Utilized, including fiber-optic cables.

A pair of detectors 28 and 30 are provided to receive signals 18 and 20 and generate electrical signals, 18' and 20' which are representative of signal and idler beams 18 and 20. Detectors 28 and 30 may be any one of a number of conventional photo detectors. The electrical signals 18' and 20' are then fed through a noise suppression device 36 which subtracts signal 20' from signal 18' to cancel the quantum noise components within the signals, thereby yielding a signal having substantially only the information encoded by encoder 22. Noise suppression device 36 may comprise any suitable device for subtracting one electrical signal from another. Further, noise suppressor 36 may be alternatively configured to operate directly on optical beams 18 and 20, without requiring conversion to electrical signals.

The resulting information signal 38 is transmitted into a receiver 40 which demodulates the information signal to extract the information content from the message. Receiver 40 may be any of a variety of conventional demodulation receivers and may be connected to a convention computer system for displaying the information content of the message.

Thus, FIG. 1 provides an overview of an optical transmission system which exploits non-classical correlations between a pair of optical beams to enable transmission of information over the pair of beams wherein the information is obscured by a high noise content of the beams. The various novel components of optical transmission system 10 will now be described in greater theoretical and practical detail.

A full appreciation of the operation and effect of the NOPA requires an initial understanding of the Einstein-Podolsky-Rosen Paradox and the Heisenberg Uncertainty principle of quantum mechanics. Accordingly, a brief summary of these phenomena as they relate to non-degenerate optical parametric amplification will now be provided. The Heisenberg Uncertainty principal sets forth a fundamental phenomena of quantum mechanics wherein certain physical parameters of a quantum system can not both be simultaneously measured to arbitrary precision. For example, both the location and the momentum of a particle can not be simultaneously known to arbitrary precision. A measurement detecting the position of the particle causes a corresponding loss of knowledge regarding the momentum of the particle. Location and momentum, as well as other physical parameters which are subject to the Heisenberg Uncertainty principle, are referred to as conjugate variables or parameters. The inability to simultaneously precisely determine both quantities of a pair of conjugate variables is not a result of a lack of detector sophistication but a fundamental limitation inherent from the laws of quantum mechanics.

The Heisenberg Uncertainty principle also applies to electromagnetic fields. However, for electromagnetic field, position and momentum are not readily applicable concepts. Rather, for electromagnetic field, the conjugate variables are quadrature phase and amplitude variables of the field.

Under certain circumstances, a pair of correlated electromagnetic fields can be generated, which have identical, or opposite, conjugate variables. Accordingly, a measurement of a conjugate variable of one of one field yields information specifying the conjugate variable of the correlated field without requiring a separate measurement of the second field in apparent violation of the Heisenberg Uncertainty principle. This apparent violation of the Heisenberg Uncertainty principle was first proposed by Einstein, Podolsky and Rosen in 1935 and is hereinafter referred to as the EPR Paradox, (A. Einstein, B. Podolsky, and N. Rosen, Phys. Rev. 47,777 (1935)).

Correlated electromagnetic fields are generated by converting photons of a single electromagnetic field into pairs of correlated photons using a process known as parametric down-conversion. The process of parametric down-conversion has been employed to produce a variety of nonclassical states of light. Examples of non-classical states of light include squeezed states, single photon Fock states, two-photon states and twin photon beams. For the particular case of non-degenerate parametric down-conversion, a pump photon is split into a pair of photons called signal and idler that are highly correlated in time and in photon number. The quadrature-phase amplitudes for these two beams are also highly correlated. Non-degenerate optical parametric oscillators (NOPO) may be employed to generate the signal and idler beams. When a pump beam to the NOPO is relatively strong but below a certain threshold value, the NOPO can be considered as a NOPA with appreciable gain over a limited bandwidth. For inputs in the vacuum state, the NOPA amplifies the incoming vacuum noise and produces two noisy outgoing signal and idler beams with large fluctuations in quadrature-phase amplitudes. However, because of the splitting of pump photons in the amplification process, the fluctuations of optical amplitudes for the two beams are strongly correlated so that under a limiting condition, the pair are "quantum copies" of each other, as illustrated in FIG. 3.

In 1935, Einstein, Podolsky and Rosen (EPR) proposed a experiment involving a system of two particles spatially separated but correlated in position and momentum. From their view of local realism, EPR concluded that quantum mechanics is incomplete since apparently canonically conjugate variables for one of the particles could be assigned definite values from measurements of the other particle in conflict with the Heisenberg uncertainty principle. The irreducible conflict between quantum mechanics and local realism was finally understood and formalized by Bell in the well-known Bell inequalities, (J.S. Bell, "Physics" (N.Y.) 1,195 (1965)). Throughout the second half of this century, most theoretical discussions including the classic one by Bell and all experiential demonstrations have focused on a discrete version of the EPR paradox which involve a system with discrete variables (such as electron spin or photon polarization), in contrast to the system originally discussed by EPR with continuous variables (position and momentum). The discrete version was first proposed by Bohm, (D. Bohm, "*Quantum Theory*" (Prentice Hall, N.J., 1951)).

The fundamental issue in experiments of the type proposed either by EPR or by Bohm is the existence in the quantum theory of a non-local correlation between two spatially separated subsystems. Bell proved that such quantum correlations are so large in certain systems as to exclude a whole class of theories based (hidden-variables theories) upon objective realism. It has been found that signal and idler beams generated by parametric down conversion, have intrinsic correlations of these beams leading to quantum non-local correlations discussed above.

Inclusive of these experiments with photon pairs in parametric down conversion, the reported demonstrations of the EPR paradox and of violations of Bell inequalities are based on correlations of discrete variables. An experimental demonstration of the EPR paradox with continuous variables is set forth in "*Realization of the Einstein-Podolsky-Rosen Paradox for Continuous Variables in Nondegenerate Parametric Amplification*", Z.Y. Ou, S.F. Pereria, and H.J. Kimble, Appl. Phys. B. (1992). This paper provides full theoretical treatment of the EPR paradox as it relates to continuous variables generated by non-degenerate parametric amplification and is incorporated herein by reference. The paper also references related research in the field. The paper describes the nonclassical correlations of quadrature-phase amplitudes between signal and idler beams generated by a sub-threshold optical parametric oscillator that is operated in a frequency degenerate but polarization non-degenerate. The analysis provided in the paper sets forth a substantially faithful realization of the original EPA paradox for continuous variables.

The paper describes an experiment which verifies that the EPR effect occurs for continuous variables. Pertinent aspects of the experiment are described herein below.

For the experiment, a non-degenerate optical parametric oscillator 100 was constructed with signal (mode 1) and idler (mode 2) beams generated as the output modes ($b_1^{(0)}$, $b_2^{(0)}$). The NOPO is illustrated schematically in FIG. 4. Pump strength of the NOPO is controlled such that the oscillator is always operated below threshold. When operated below threshold, the NOPO is effectively a NOPA with gain determined by the pump strength and with a bandwidth limited by the cavity line width (which is typically much smaller than the phase matching band width of the nonlinear medium). Non-degeneracy is achieved via a Type II parametric process where the two down-converted modes (signal and idler) have orthogonal polarizations.

Figure 5:
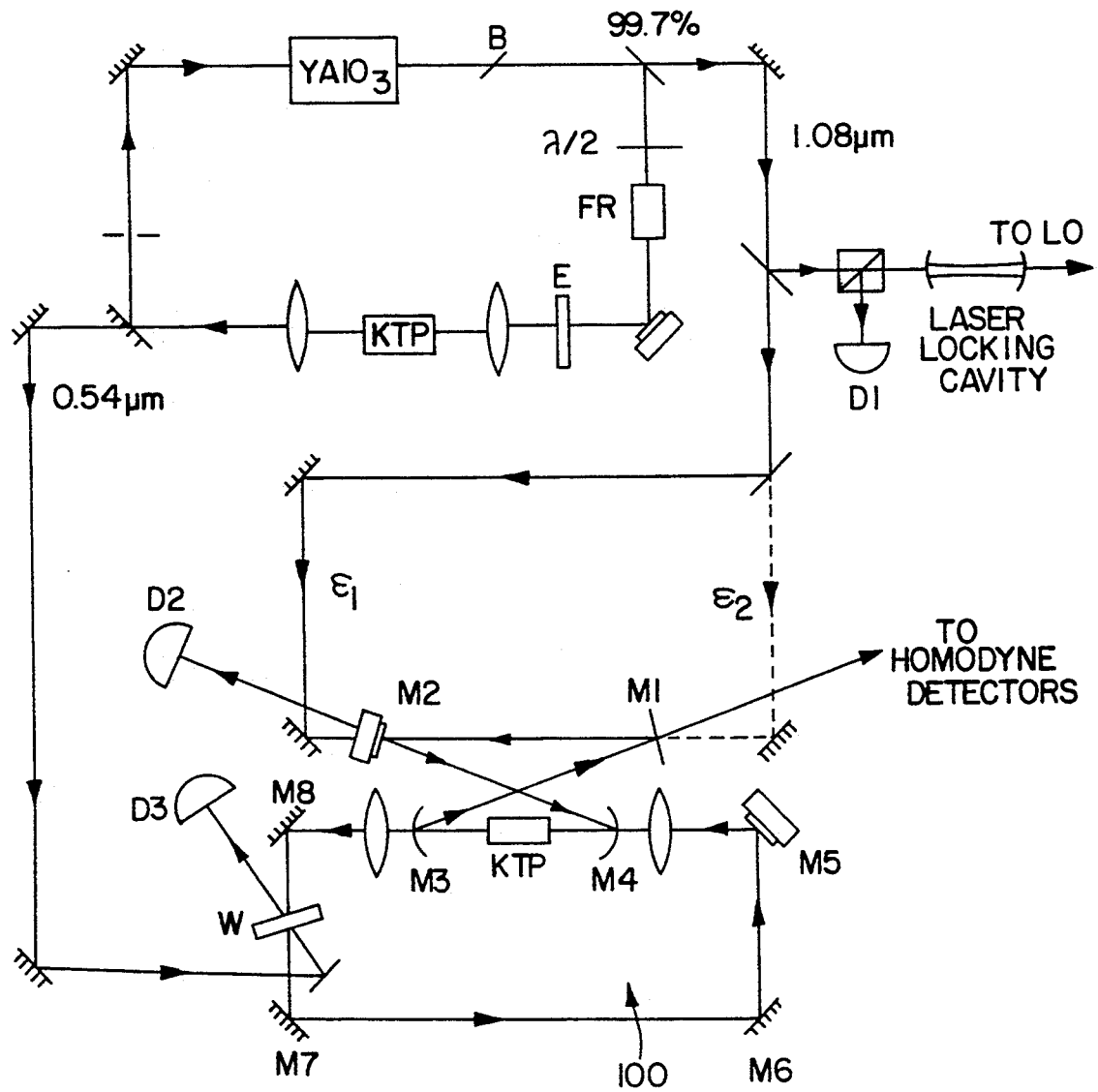
FIG. 5 is a schematic illustrating an experimental test set-up employing the NOPA of FIG. 1.

A more detailed diagram of the experimental arrangement is provided in FIG. 5. The NOPA consists of a folding ring cavity of total length 38 cm with two curved mirrors M3, M4 of 10 cm radius of curvature and two flat mirrors M1, M2. Three of the mirrors M2, M3, and M4 have high reflectivity (99.98%) at 10.8 $\mu$m and relatively high transmission (94 - 96%) at 0.54 $\mu$m. M1 is an output coupler for a sub-harmonic field at 1.08 $\mu$m with transmission coefficient of 3%. A nonlinear medium potassium titanyl phosphate (KTP) crystal is placed between the two curved mirrors where the small waist of the cavity is located with an approximate waist size of $\omega_0 = 60$ $\mu$m.

The KTP crystal for the down conversion process is a $3 \times 3 \times 10$ mm$^3$, a-cut crystal with two faces dual-band anti-reflection coated to minimize the loss at 1.08 $\mu$m and 0.54 $\mu$m. The two modes (signal and idler) are polarized along the b and c axes of the crystal, respectively. Type II noncritical phase matching at 1.08 $\mu$m is achieved at a temperature of 63° C. with a full width of about 30° C. Because of the nature of Type II processes, both the b— and c—polarized beams are not usually simultaneously resonant for a given cavity length. However, the b— and c—polarized beams have different temperature dependencies for their indices of refraction inside the crystal, so that by fine tuning of the crystal temperature, a condition of simultaneous resonance is achieved for the signal and idler fields ($a_1, a_2$). In the experimental arrangement, the temperature tolerance to maintain the dual resonance condition is about 20 mK and the separation between two consecutive overlapping resonances of the b— and c—polarized beams is about 10° C. An active stabilization circuit is used in order to fix the crystal temperature to a few mK.

A well-known Pound-Drever RF sideband technique is employed to lock the NOPA cavity onto resonance for the signal mode (b—polarization) with the help of an auxiliary beam that is counter-propaginating relative to the down-converted beams (modes 1,2) from the pump field (beam $\epsilon_1$ and detector D2 in FIG. 5). Such a beam does not adversely affect the system performance as long as the backscattering is small i.e. $<10^{-4}$. Once the signal mode ($a_1$) is locked on resonance, an adjustment of the temperature of the crystal brings the orthogonal idler mode ($a_2$) into resonance.

The NOPA cavity is pumped at 0.54 $\mu$m with a beam polarized along the b—axis that is coupled into the cavity through mirror M4 which has a transmission coefficient of 96% at 0.54 $\mu$m. The green pump power is built up in an independent cavity formed by the high reflector mirrors M5 through M8 and the input coupler window W with an anti-reflection coating on one side. The green build-up cavity is also locked on resonance with the Pound-Drever technique by detector D3. Due to the reflection losses of the mirrors M3 and M4 at 0.54 $\mu$m, this cavity has a modest build up of about 5 times. The injected green pump power before build-up is varied from 10 mW up to about 90 mW. The injected green power for the threshold of the NOPA is approximately $P_{th} = 150$ mW.

Figure 6:
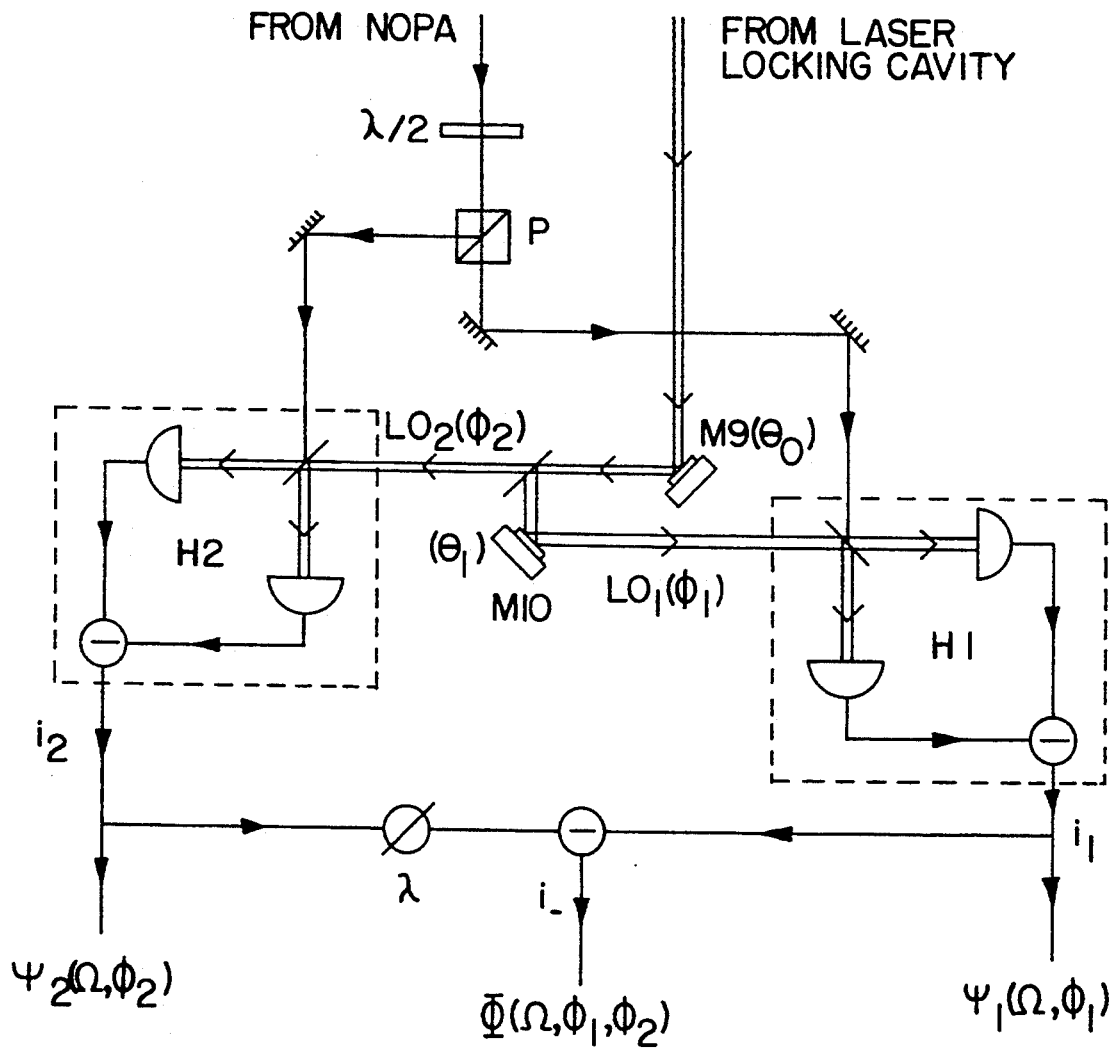
FIG. 6 is a block diagram illustrating a pair of dual balanced homodyne detectors for use in testing the optical transmission system of FIG. 5.

The field at 0.54 $\mu$m is itself generated by intra-cavity harmonic conversion in a frequency stabilized, TEM$_{00}$ Nd:YAlO$_3$ laser. As shown in FIG. 5, the laser is a ring cavity containing a a-cut $2 \times 2 \times 6.8$ mm$^3$ KTP crystal located between two lenses with 5 cm focal length for intra-cavity frequency doubling. The laser frequency is locked to an external cavity with the Pound-Drever sideband technique by detector D1. The rms linewidth is approximately 50 kHz. The fundamental beam at 1.08 $\mu$m transmitted through the laser locking cavity (which also acts as a filter cavity for the spatial mode of the beam) is intensity-stabilized, then split into two beams to serve as local oscillators for a pair of balanced homodyne detectors (FIG. 6). Fractions of the fundamental beam are used to lock the NOPA cavity ($\epsilon_1$) with an error signal derived at detector D2 and to provide a probe beam ($\epsilon_2$) for the NOPA.

To quantify the operating parameters for the NOPA, an intense probe beam ($\epsilon_2$) is injected at the fundamental frequency into the cavity via the input coupler M1 with the cavity via the input coupler M1 with the cavity used as a frequency doubler without green pump, thereby allowing quantitative measurements of the conversion efficiency of the crystal and the linear losses of the cavity. The generated green light helps to align the green build-up cavity and to mode-match it to the NOPA cavity. The classical gain of the amplifier is measured by turning on the green pump and injecting a weak probe beam $\epsilon_2$ with various polarizations through the input coupler M1. When the injected beam has the same polarization as either the signal or idler beams, a phase-intensive gain is observed for the beam through mirror M2. When the injected beam is polarized at $\pm 45°$ relative to the b—axis, a phase-sensitive gain is observed that is equal for both $\pm 45°$ polarizations By way of these tests, it was demonstrated that the system behaves as NOPA with two independent signal and idler modes (b and c axis).

A detailed diagram of the detection system for the experimental set-up is provided in FIG. 6. Output beams from the NOPA of FIG. 5 are separated with a low loss polarization beamsplitter (P). Each beam is then combined with a local oscillator by a 50:50 beam splitter to form a balanced homodyne detection scheme. Photo-currents $i_1(t)$, $i_2(t)$ from homodyne detectors H1, H2 are sent either directly to a spectrum analyzer for measurements of their spectral densities or to a hybrid junction with a phase shift of 180° where $i_2(t)$ passes first through an attenuator $\lambda$.

The spectral densities of the photocurrents $i_1(t)$, $i_2(t)$, and $i_-(t)$ recorded by the spectrum analyzer are given by $\Psi_1(\Omega)$, $\Psi_2(\Omega)$, $\phi(\Omega)$ where $\Omega$ is the analysis frequency of the spectrum analyzer. The local oscillator beam originates from the laser at the fundamental frequency. The beam passes through a spatial mode cleaning cavity (which also serves as the laser locking cavity), then is divided into a pair of beams $LO_1$ and $LO_2$ by a 50:50 beam splitter. Phases $\phi_1$, $\phi_2$ of the local oscillators $LO_1$ and $LO_2$ are varied by scanning the steering mirrors $M9(\phi_0)$ $M10$ $(\phi_1)$ which are mounted on piezoelectric transducers. Intensities of the local oscillators are actively stabilized (to about 1%) with a servo based upon a combination of an electro-optic modulator and a polarizer.

Balancing and calibration of the homodyne detectors is achieved by fine adjustment of the electronic gains and relative phases of the detectors through shot-noise levels and with external coherent amplitude modulation. Excess amplitude noise of the two local oscillator beams above the shot-noise level is measured to be less than 0.2 dB and is suppressed in the balanced homodyne detection schemes by about 30 dB. Overall, the shot-noise level at the analyzing frequency is determined to within ±0.1 dB and is principally limited by small drifts of the radio frequency $\Omega$, which have a disproportionate effect due to the resonant nature of the detection electronics. The detectors give a shot-noise level 25 dB above the electronic noise floor for a local oscillator power of 1 mW.

Figure 4:
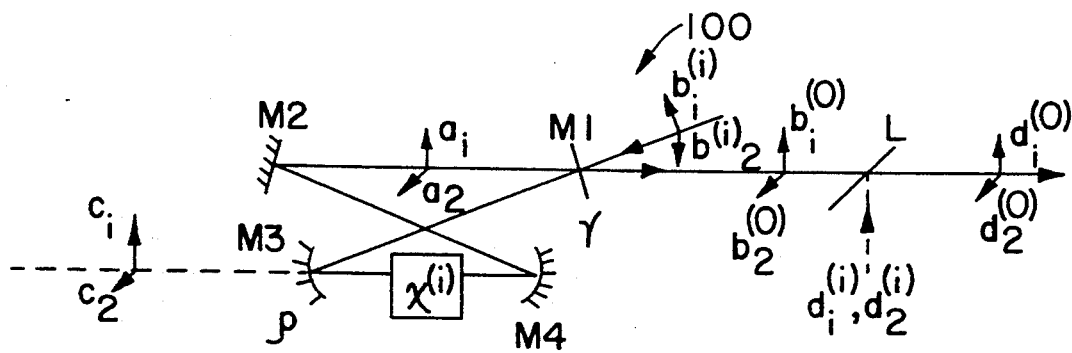
FIG. 4 is a block diagram illustrating the NOPA of FIG. 1.

The results of experiments conducted using the experimental set-up illustrated in FIGS. 4 – 6 is provided in the above identified reference work ("*Realization of the Einstein-Podolsky-Rosen Paradox for Continuous Variables in Nondegenerate Parametric Amplification*", Z.Y. Ou, S.F. Pereria, and H.J. Kimble, Appl. Phys. B. (1992)). The experiments verified that the EPR effect applies to continuous conjugate variables produced by non-degenerate parametric amplification. The experiments further established that a noise level achieved using the system is several dB below a theoretical minimum achievable using classical electro-magnetic fields.

A second experiment was conducted to verify that information can be encoded and transmitted using a pair of signal and idler beams generated using an NOPA. An experimental setup and the results of the experiment are illustrated in the remaining Figures. A test set-up for the second experiment is illustrated in block diagram form in FIG. 7. An NOPA 116 generates a pair of correlated optical beams 118 and 120 from a pair of vacuum signals 119 and 121. NOPA 116 generates beams 118 and 120 by using power provided in a pump beam 123, which is preferably a laser beam. Correlated beams 118 and 120 have orthogonal correlated components. The beams initially travel along identical paths. An information carrying message beam 125 is generated by conventional means (not shown). Message beam 125 carries information content modulated by any of a large number of conventional techniques. Preferably, however, information is modulated onto the beam by merely activating and deactivating the beam, thereby generating binary pulses.

Information message 125 and correlated beams 118 and 120 are combined using a highly reflecting mirror 127 which allows a preselected portion of information beam 125 to enter reflected correlated beams 118 and 120. Information beam is polarized to an angle 45 degrees relative to the modes of the orthogonal correlated beams, i.e., the information beam is polarized to an angle mid-way between the polarization angles of the correlated beams. The relative amplitude of the information beam and the correlated beams is selected by choosing an appropriate gain for NOPA 121 and by selecting a suitable material having a desired transmission coefficient for mirror 127. Preferably, the amplitude of the information beam which merged with the correlated beams is far below the noise level of the correlated beams, such that the information is obscured within the correlated beams.

Figure 7:
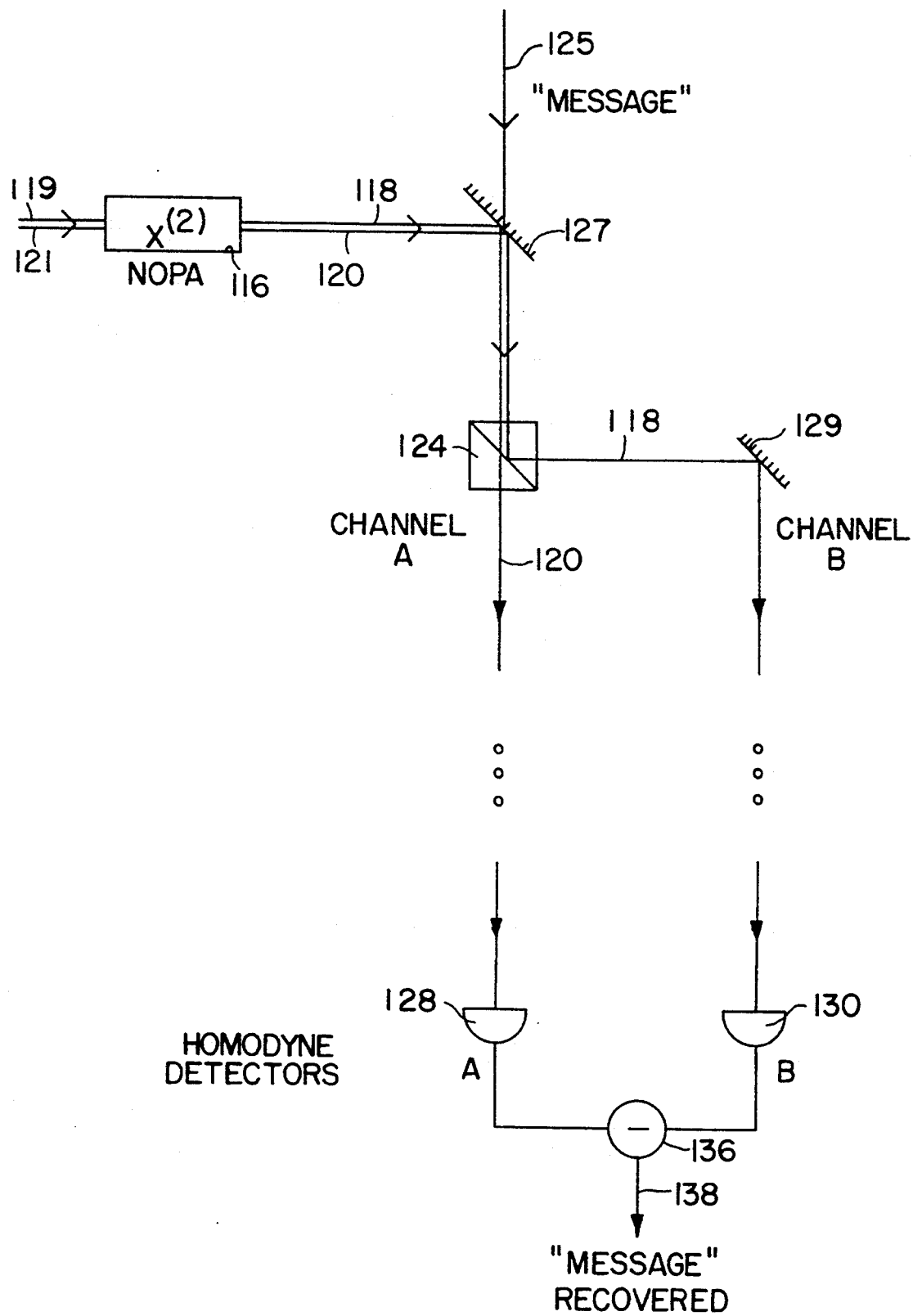
FIG. 7 illustrates a second experimental test set-up.

The correlated beams are split onto spatially separate paths by a beam splitter/polarizer 124. Splitter/polarizer 124 causes beam 118 to reflect at a ninety degree angle from beam 120. As a result of the orientation of the information beam relative to the correlated beams, one half of the information beam follows a path defined by beam 118 while the other half follows a path defined by beam 120. In FIG. 7, beam 120 is also identified as channel A and beam 118 is identified as channel B. A mirror 129 reflects beam 118, and the information signal contained therein, to a path parallel, but spatially separated from, beam 120. A pair of homodyne detectors 128 and 130, constructed as described above, receive beams 118 and 120 and generate electrical signals 118' and 120' which are representative of the optical beams. A noise suppressor 136 subtracts signal 118' from signal 120' or vice versa, to eliminate the correlated noise components and leave an information signal 138 containing the information content of information message beam 125. In principle, all of the correlated noise is eliminated thereby leaving an information signal having a signal to noise ratio identical to that of the information beam 125. In practice, noise sources within the system tend to degrade the resulting signal to noise ratio. A conventional decoder, not shown, may be employed to decode the message contained within signal 138 and display the message.

Considering the test set-up illustrated in FIG. 7 in more detail, the system operates to combine a coherent signal of amplitude $\epsilon/t$ (the "message") with the large fluctuating fields generated by a nondegenerate optical parametric amplifier (NOPA). Each of these two beams has large phase intensive fluctuations that are individually indistinguishable from a thermal source, the quadrature-phase amplitudes of the two-beam are quantum copies of one other. Hence proper subtraction of the photocurrents at the receiver shown in FIG. 7 results in the faithful reconstruction of the encoded "message" even though the signal-to-noise ratio $R_{s,i}$ during transmission are individually much less than one. Indeed in a lossless system with $t << \epsilon << 1$, $R_{s,i}$ during transmission is given approximately by $R_{s,i} \simeq \epsilon^2/2[2G^2 - 1] << 1$ with $G >> 1 + t^2$ as the amplifiers gain, where t is the transmission coefficient for mirror 127, $\epsilon/t$ is the amplitude of the injected message signal, and G is the gain of the NOPA. However because of the possibility of perfect subtraction of the correlations fluctuations of magnitude $2G^2-1$ on each beam, the signal-to-noise ratio of the reconstructed message in the detect photocurrent i_ is $R_d \cong \epsilon^2/t^2$ precisely as for the original message written as a coherent state before the mirror 127 in FIG. 7. Since in principle we can have $\epsilon << 1$, with the level unity denoting the single-beam vacuum-state level, the technique is substantially immune against unauthorized interception. Any such attempt degrades $R_d$; the only way to achieve a signal-to-noise ratio comparable to $R_d$ is to extract substantially the whole of both signal and idler beams 118 and 120.

Similar schemes for two-channel communication can be implemented with correlated classical (thermal) sources, each with large fluctuations which hide the message $\epsilon/t$. However with classical sources, of whatever type, only excess fluctuations such as thermal noise can be subtracted; the quantum fluctuations at the vacuum level remain unchanged and set a noise floor for information transmission and extraction. For the case illustrated in FIG. 7, this noise floor is given by the sum of independent vacuum fluctuations for signal and idler beams 118 and 120 and sets a fundamental noise level of "2" (with "1" as the individual vacuum state limits for signal and idler beams). Here the usual convention for the xx between classical and nonclassical correlations in terms of the behavior the Glauber-Sudarshan phase-space function is adopted. Hence for the case illustrated in FIG. 7, the signal-to-nose ratio $R_c^c$ for the detected message at the receiver for classical fields is given by $R_d \cong |\epsilon|^2/2 << 1$. Thus the use of quantum correlated fields gives an improvement in the signal-to-noise ratio (SNR) beyond the limit that can be achieved by classical sources. Of course in practice, the NOPA has finite gain, and losses due to scattering, absorption and imperfect detection which limit the degree of correlation that can be measured and hence exploited for communication. Nonetheless, the test set-up of FIG. 7 demonstrates an improvement to signal-to-noise ratio $R_d$ of 3 dB over that possible with any classical source and have indeed succeeded in suppression of photocurrent noise in i_below that associated with the vacuum fluctuations of even a single beam, thus making possible transmission with $|\epsilon''|^2 << 1$.

The NOPA of FIG. 7 is configured substantially as described above. The coherent message beam is injected at 45° with respect to signal and idler polarization and is frequency shifted (single side band) by 1.1 MHz from the primary laser frequency with the help of a pair of acoustooptic modulators (not shown), which are gated "on" and "off" to provide information encoded for transmission. The noisy but correlated signal and idler beams 118 and 120 together with coherent information are then separated by a polarizer P, propagated as in transmission, and then directed to two separate balanced homodyne detectors for the measurements of their quadrature-phase amplitudes. The local oscillators for two balanced homodyne detectors originate from the laser at 1.08 μm; with phases independently controlled by mirrors mounted on piezoelectric transducers (not shown). The spectral densities of the photocurrent fluctuations of the signal beam $\Psi_s(\Omega)$ of the idler beam $\Psi_i(\Omega)$ and of the combination of the two photocurrents $\Psi_-(\Omega)$ were recorded by an RF spectral analyzer, where $i_- = i_s - i_i$.

Figure 8:
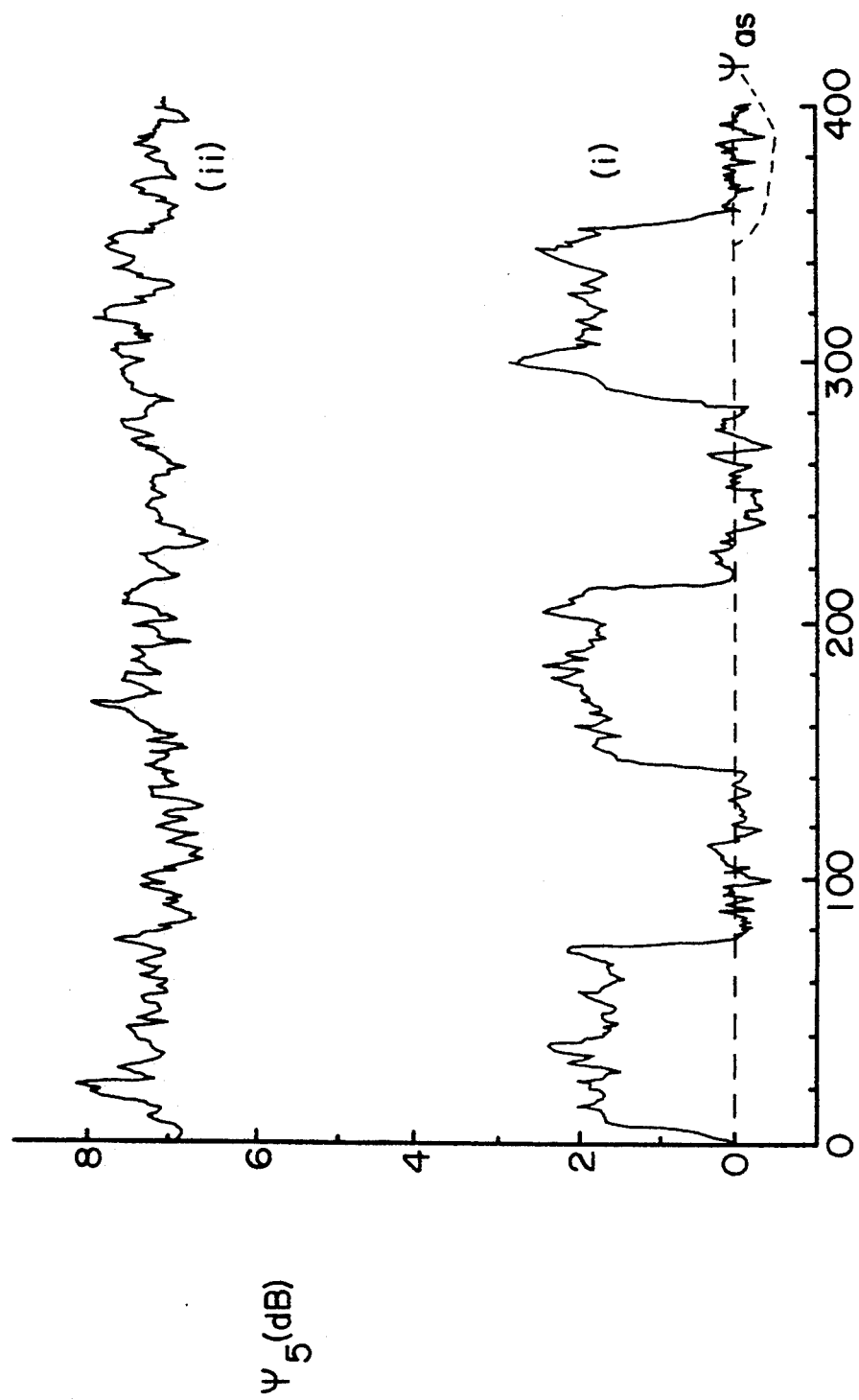
FIG. 8 illustrates spectral density photocurrent fluctuations for signal and encoded information generated by the set-up of of FIG. 7.
Figure 9:
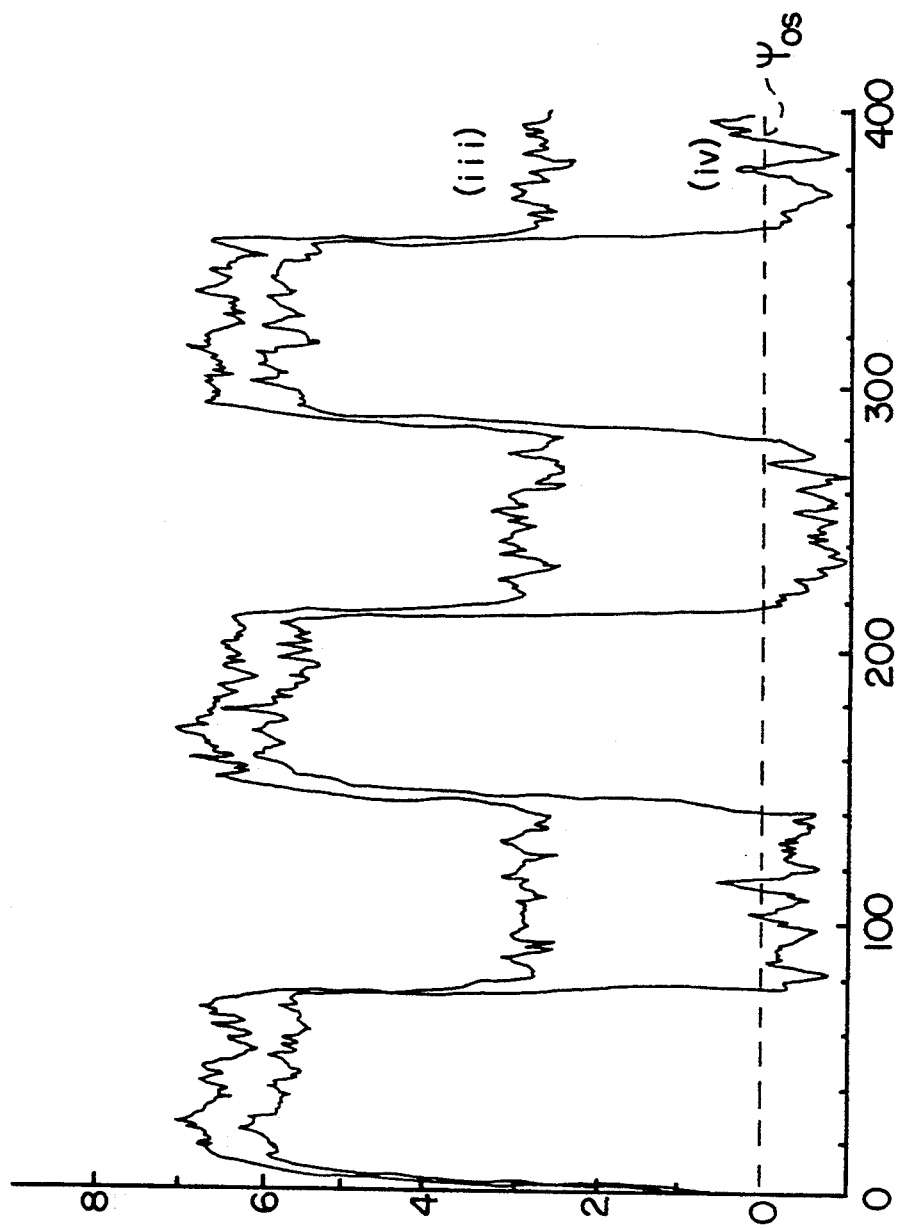
FIG. 9 illustrates spectral density photocurrent fluctuations for combined signal and idler beams, and encoded information for the test set-up of FIG. 7.

FIG. 8 illustrates results from a series of measurements of these various spectral densities. In FIG. 8, trace ii gives the spectral density $\Psi_s$ of the signal beam along with an injected "message" with the amplifier turned on to generate large (~7 dB) phase intensive noise above the vacuum-state level $\Psi_{os}$ for the signal beam. A similar trace is obtained for the spectral density $\Psi_i$ of the idler beam. By contrast, trace iv in FIG. 9 gives the spectral density $\Phi_-$ for the difference photocurrent i_, with the phases of the local oscillators adjusted for minimum noise. In this trace, the coherent message that was completely obscured in trace ii of FIG. 8 emerges with high signal-to-noise ratio. Note the correlated quantum fluctuations for signal and idler fields are subtracted below with the vacuum-noise level of signal or idler beam along.

FIG. 8 trace i and FIG. 9 trace iii illustrates results obtained with the amplifier turned off (that is, uncorrelated vacuum-state inputs for signal and idler). FIG. 8 trace i shows the encoded information for the signal beam, where the noise floor $\Psi_{os}$ is from the vacuum fluctuations of the signal beam; a similar trace is obtained for the idler beam ($\Psi_i$) FIG. 9 trace iii gives the corresponding result for $\Phi_-$ for the combined signal and idler photocurrents when the amplifier is off. Note that this trace represents the best possible SNR with which the encoded information can be recovered when correlated classical noise sources are employed since here the (uncorrelated) vacuum fluctuations of signal and idler set an ultimate noise floor. On comparing traces iii and iv in FIG. 9 it can be seen that the correlated quantum fluctuations of signal and idler with the amplifier result in an improvement in SNR of 3.5 dB relative to that possible with classical noise sources.

In addition, it is also observed in FIG. 9, trace iv that $\Psi_-$ for the noise only (corresponding to the encoded information chopped off) lies about 0.5 dB below the vacuum noise level of the signal (or idler) beam alone shown as $\Psi_{os}$ indicating an improvement in SNR over the conventional single channel communication scheme with classical light source.

The improvements in SNR with correlated quantum fields over classical fields in the two-channel communication scheme of FIG. 7 can perhaps be of greatest use when the encoded is carried out with correlated classical sources (that is, vacuum noise dominates the encoded signal). This situation is illustrated in FIG. 10 where once again $\Psi_-$ is plotted for the two cases without (trace i) and with (trace ii) correlated quantum fields. Relative to FIG. 8, the coherent beams has been attenuated resulting in a smaller SNR for the encoded information. As can be seen in trace (i), the information is "buried" in the vacuum noise and hardly recognized, thus the recovery of the encoded information is poor. On the other hand, when correlated quantum fields are used, the reduction of more than 3 dB in the vacuum fluctuations make a much clearer recovery for the encoded information, as shown in trace (ii), with the recovery here limited by losses in propagation and detection.

The degree of immunity to interception for a two channel scheme is related to the degree of excess fluctuations for each individual beam. This differs from a classical implementation wherein the excess noise used to "hide" the encoded information in each beam comes from background or some other artificial unrelated source. Unfortunately such uncorrelated excess fluctuations also add noise to the coincidence signal in the recovery of the "message," even though the added noise scales differently as a function of photon number for signal beam measurements (linearly) and for dual beam measurements (quadratically). Hence larger background noise which better "hides" the encoded information, also brings larger added noise in the extraction of the "message." Because of the quadratic dependence on the total photon number for the extra noise added in coincidence, low light level transmission is best suited for this scheme. However, the situation is quite different of the quadraturephase amplitudes of the correlated signal and idler fields generated form NOPA. As the NOPA is pumped harder and the threshold is approached, the gain of the amplifier increases, and so does the excess fluctuations of the signal and idler fields. However, the correlation between the fluctuations of the signal and idler beams also improves, giving rise to better improvement in SNR for the recovered signal. Thus the large fluctuations needed for better immunity to interception in the signal and idler beams are intrinsic and do not add extra noise to the recovered signal but, on the contrary, will reduce the noise as the gain of the amplifier increases (Indeed, $\Phi_- \to 0$ for large gains and lossless propagation). Ultimately, the improvement in SNR for the recovered message is arbitrated by the imperfect correlation resulting from finite gain and from passive losses in propagation and detection. On the other hand, this dependence provides a powerful means to detect eavesdropping because unauthorized extraction of signal or idler fields will result in a reduction of the detected correlation and hence an increase in the noise floor of the recovered message.

What has been described is an optical information transmission system which allows information to be obscured within noisy signals transmitted on separate paths. The information content is extracted by subtracting one of the signals from the other to eliminate noise from the signals. The noise is successfully removed from the signals by subtraction of one signal from the other because the noise is highly correlated. The use of an NOPA as a beam generator ensures that the resulting pair of beams have highly correlated conjugate continuous quantum parameters, subject to a high amount of quantum noise, which is likewise highly correlated. Due to the high correlation of the quantum noise in the pair of beams, the noise is substantially and entirely removed from the signals by subtraction of one signal from the other. A resulting information signal is produced which itself has a signal to noise ratio below that which can be achieved by using classical transmission techniques due to the presence of vacuum noise.

Although described with respect to a optical transmission system employing an $\chi^2$ technique to generate a pair of orthogonal beams of equal frequency, principles of the invention can be advantageously applied to generate a pair of optical beams of differing frequency. Furthermore, other techniques besides $\chi^2$ techniques can be employed, including for example, $\chi^3$ techniques. Indeed, principles of the invention can be employed to transmit information signals within any beam comprised of bosons of spin 1. Hence, a photon beam need not be employed.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those ordinarily skilled in the art.

What is claimed is:

1. A method for transmitting information, comprising the steps of:
    generating a pair of beams having an information signal obscured within correlated quantum noise;
    transmitting said pair of beams;
    detecting said pair of beams; and
    combining said pair of detected beams to subtract said correlated quantum noise and to extract said information signal.

2. The method of claim 1, wherein said information signal on said beams has a signal to noise ratio less than 1, and wherein said detected beams are combined to leave an information signal having a signal to noise ratio greater than 1.

3. A method for transmitting information, comprising the steps of:
    generating first and second optical beams having correlated quantum noise;
    modulating said first and second optical beams with an information signal
    transmitting said first and second beams;
    detecting said first and second beams; and
    combining said first and second beams to substantially eliminate said correlated quantum noise from said beams.

4. The method of claim 3, wherein said information signal is modulated onto said beams with a signal to noise ratios less than 1, and wherein said detected optical beams are combined to extract information signal having a signal to noise ratio greater than 1.

5. A method for transmitting information, comprising the steps of:
    generating a plurality of optical beams within a non-degenerate optical parametric amplifier with said optical beams having correlated quantum noise components;
    modulating an information signal onto said beams with a signal to noise ratio substantially less than 1;
    transmitting said beams;
    detecting said beams; and
    combining said beams to subtract said correlated quantum noise components to extract said information signal with a signal to noise ratio substantially greater than 1.

6. An apparatus for transmitting information, comprising:
    non-degenerate optical parametric amplification means for generating first and second correlated optical beams, said first and second correlated beams having correlated quantum noise components;
    means for modulating an information signal onto said beams;
    means for detecting said first and second beams; and
    means for combining said first and second beams to eliminate said correlated quantum noise components and extract said information signal.

7. The apparatus of claim 6, wherein said means for detecting comprises a quadrature phase detector.

8. The apparatus of claim 6, wherein said means for modulating said information signal on said beams modulates said information signal to produce a signal to noise ratio less than 1, and wherein said means for combining said detected optical beams combines said beams to extract an information signal having a signal to noise ratio greater than 1.

9. A method for transmitting information, comprising the steps of:
generating first and second optical beams having correlated quantum noise;
generating a third optical beam having an information content;
combining said third optical beam with each of said first and second optical beams to produce first and second combined beams, wherein the information content of said third beam is obscured within correlated quantum noise within each individual combined beam;
transmitting said first and second combined beams;
detecting said first and second combined beams; and
combining said first and second combined beams to substantially eliminate said correlated quantum noise from said beams, leaving said information beam.

10. The method of claim 9, wherein said first and second beams are generated using a non-degenerate parametric amplifier.

11. The method of claim 9, wherein said first and second beams have orthogonal modes.

12. The method of claim 10, wherein said third optical beam is polarized to an angle of 45 degrees from the orthogonal modes of both of said first and second beams.

13. The method of claim 12, further including the step of spatially separating said first and second combined beams.

14. The method of claim 13, wherein said step of spatially separating said first and second combined beams includes the step of passing said first and second combined beams through a polarized beam splitter.

15. An apparatus for transmitting information, comprising:
means for generating first and second optical beams having correlated quantum noise;
means for generating a third optical beam having an information content;
means for combining said third optical beam with each of said first and second optical beams to produce first and second combined beams, wherein the information content of said third beam is obscured within correlated quantum noise within each individual combined beam;
means for transmitting said first and second combined beams;
means for detecting said first and second combined beams; and
means for combining said first and second combined beams to substantially eliminate said correlated quantum noise from said beams, leaving said information beam.

16. The apparatus of claim 15, wherein said means for generating said first and second beams is a non-degenerate parametric amplifier.

17. The apparatus of claim 15, wherein said first and second beams have orthogonal modes.

18. The apparatus of claim 17, wherein said third optical beam is polarized to an angle of 45 degrees from the orthogonal modes of both of said first and second beams.

19. The apparatus of claim 18, further including means for spatially separating said first and second combined beams.

20. The apparatus of claim 19, wherein said means for spatially separating said first and second combined beams includes a polarized beam splitter.

21. The apparatus of claim 15, wherein said means for detecting said first and second combined signals comprises a photo detector generating first and second electrical signals representative of the first and second combined optical signals.

22. The apparatus of claim 21, wherein said means for combining said first and second combined signals comprises means for combining said first and second electrical signals.

* * * * *

UNITED STATES PATENT AND TRADEMARK OFFICE
CERTIFICATE OF CORRECTION

PATENT NO. : 5,339,182
DATED : August 16, 1994
INVENTOR(S) : Kimble et al.

It is certified that error appears in the above-identified patent and that said Letters Patent is hereby corrected as shown below:

On the title page: Item

[75] Inventors:  delete "Silvania E. Pereira"

insert --Silvania F. Pereira--

Signed and Sealed this

Twenty-seventh Day of February, 1996

Attest:

BRUCE LEHMAN

Attesting Officer

Commissioner of Patents and Trademarks